(12) United States Patent
Gong

(10) Patent No.: US 10,184,836 B2
(45) Date of Patent: Jan. 22, 2019

(54) MULTI-OPTICAL SHOOTING SYSTEM

(71) Applicant: UNION OPTECH CO., LTD., Zhongshan, Guangdong (CN)

(72) Inventor: Junqiang Gong, Guangdong (CN)

(73) Assignee: UNION OPTECH CO., LTD., Zhongshan (CN)

( * ) Notice: Subject to any disclaimer, the term of this patent is extended or adjusted under 35 U.S.C. 154(b) by 0 days.

(21) Appl. No.: 15/719,601

(22) Filed: Sep. 29, 2017

(65) Prior Publication Data

US 2018/0283944 A1 Oct. 4, 2018

(30) Foreign Application Priority Data

Mar. 29, 2017 (CN) .......................... 2017 1 0200521

(51) Int. Cl.
*G01J 3/28* (2006.01)
*G01J 3/14* (2006.01)

(52) U.S. Cl.
CPC ............... *G01J 3/2823* (2013.01); *G01J 3/14* (2013.01); *G01J 2003/2826* (2013.01)

(58) Field of Classification Search
CPC ........ G01J 3/30; G01J 3/44; G01J 3/18; G01J 3/02; G01J 3/14; G01J 3/28; G01J 3/10; G01N 21/00; G01N 21/31; G01N 21/55
See application file for complete search history.

(56) References Cited

U.S. PATENT DOCUMENTS

| | | | |
|---|---|---|---|
| 6,556,354 B1* | 4/2003 | Jourjon | G02B 15/10 359/672 |
| 7,202,953 B1* | 4/2007 | Mueller | G01J 3/02 250/201.2 |
| 2007/0121110 A1* | 5/2007 | Kralik | G01J 3/02 356/318 |
| 2008/0198729 A1* | 8/2008 | Izuhara | H04N 5/23212 369/112.23 |

* cited by examiner

*Primary Examiner* — Abdullahi Nur

(57) ABSTRACT

The present invention discloses a multi-optical shooting system, including an optical lens, where a spectroscopical module that can split a light wave transmitted from the optical lens into several light waves in different wavelength ranges is disposed on an imaging side of the optical lens; the shooting system further includes at least two photosensitive chips configured to receive light signals that are obtained by means of splitting by the spectroscopical module; the shooting system further includes an image processing system that can integrate and output light waves received by the photosensitive chips; and the spectroscopical module includes at least one spectroscopical component, where the spectroscopical component is a prism, a thin film, or a plane mirror. In the present invention, high definition of a shot image is implemented, image color restoration is good, and clear imaging can be implemented even in low illuminancy.

4 Claims, 1 Drawing Sheet

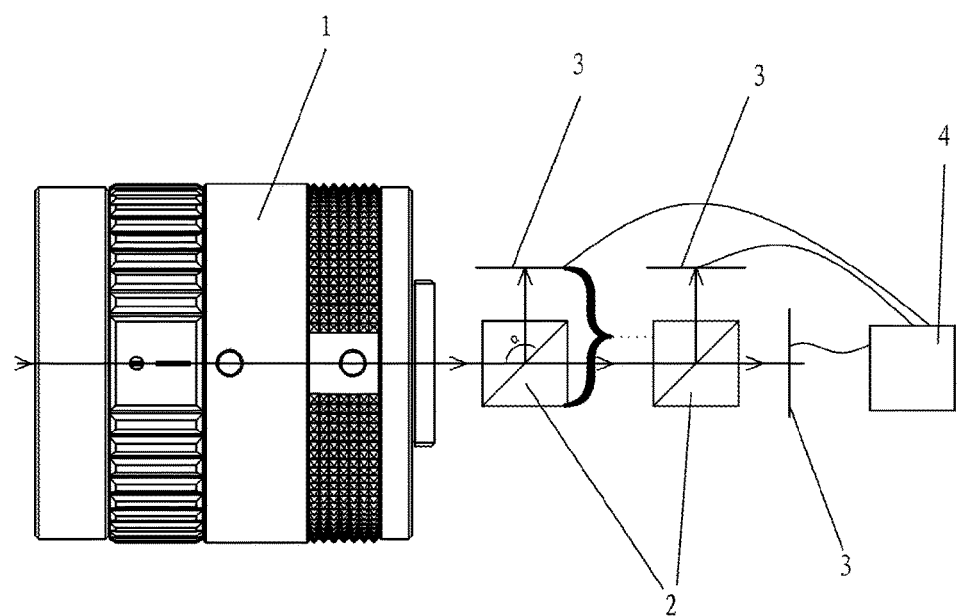

MULTI-OPTICAL SHOOTING SYSTEM

CROSS REFERENCE TO RELATED APPLICATIONS

The present application claims the benefit of Chinese Patent Application No. 201710200521.5 filed on Mar. 29, 2017. All the above are hereby incorporated by reference.

BACKGROUND

Technical Field

The present invention relates to an optical system, and in particular, to a multi-optical shooting system.

Related Art

Currently, a monitoring shooting system is widely applied to people's daily life. However, a current security monitoring system and road condition system have the following disadvantages:

1. In an existing shooting system, a manner of matching a single lens with a single photosensitive chip is used, and for the single photosensitive chip, a light wave wavelength that needs to be received is relatively wide, therefore causing overall picture definition to be not high, and a shooting effect of the entire picture to be not good.

2. In an existing shooting system, a manner of matching a single lens with a single photosensitive chip is used, and wavelengths reflecting various colors are not well restored in the single photosensitive chip, therefore causing a phenomenon of the color of a shot picture being not full.

3. In an existing shooting system, a manner matching a single lens with a single photosensitive chip is used, and in an environment with low illuminancy, wavelengths of some light waves cannot be utilized, causing an amount of overall passed light to decrease, and a shot image to be unclear.

Therefore, the present invention emerges based on the foregoing disadvantages.

SUMMARY

A technical problem that needs to be resolved by the present invention is to provide a multi-optical shooting system. In the system, high definition of a shot image is implemented, image color restoration is good, and clear imaging can be implemented even in low illuminancy.

To resolve the foregoing technical problem, the present invention uses the following technical solutions: a multi-optical shooting system, including an optical lens, where a spectroscopical module that can split a light wave transmitted from the optical lens into several light waves in different wavelength ranges is disposed on an imaging side of the optical lens; the shooting system further includes at least two photosensitive chips configured to receive light signals that are obtained by means of splitting by the spectroscopical module; the shooting system further includes an image processing system that can integrate and output light waves received by the photosensitive chips; and the spectroscopical module includes at least one spectroscopical component, where the spectroscopical component is a prism, a thin film, or a plane mirror.

According to the foregoing multi-optical shooting system, a coating film layer is used on the surface of the spectroscopical module.

According to the foregoing multi-optical shooting system, there is an included angle a between light emitted by the optical lens and the spectroscopical module, where $0<a<180°$.

According to the foregoing multi-optical shooting system, the shooting system includes at least one spectroscopical module.

According to the foregoing multi-optical shooting system, the shooting system includes two spectroscopical modules.

According to the foregoing multi-optical shooting system, the shooting system includes three photosensitive chips.

Compared with the prior art, the multi-optical shooting system in the present invention achieves the following effects:

1. In the present invention, a spectroscopical module is used to separate light whose wavelengths are different, and therefore light waves that are output from the spectroscopical module are several light waves in different wavelength ranges. These light waves in the different wavelength ranges are separately received by different photosensitive chips. Therefore, each separate photosensitive chip receives a light wave whose wavelength range is relatively narrow, thereby improving definition of a photosensitive chip, and greatly improving definition of an entire picture finally formed by the shooting system.

2. In the present invention, a spectroscopical module is used to separate light whose wavelengths are different, and therefore light waves that are output from the spectroscopical module are several light waves in different wavelength ranges. These light waves in the different wavelength ranges are separately received by different photosensitive chips. Therefore, a wavelength range of an integral light wave received by multiple photosensitive chips added together is relatively wide, all wavelengths reflecting various colors can be fully utilized, and for an overall picture formed by light waves received by the multiple photosensitive chips added together, the color is truer to life and fuller.

3. In the present invention, a spectroscopical module is used to separate light whose wavelengths are different, and therefore light waves that are output from the spectroscopical module are several light waves in different wavelength ranges. These light waves in the different wavelength ranges are separately received by different photosensitive chips. Therefore, in low illuminancy, multiple photosensitive chips that receive light waves in different wavelength ranges are added together, so that a wavelength range of an available light wave becomes wide, increasing an amount of overall passed light, and thereby ensuring that an imaging picture is kept clear even when light is very dim.

BRIEF DESCRIPTION OF THE DRAWINGS

The following further describes a specific implementation of the present invention in detail with reference to the accompanying drawing, where:

FIG. 1 is a schematic diagram of the present invention.

Description about the accompanying drawing: 1. Optical lens; 2. Spectroscopical module; 3. Photosensitive chip; 4. Image processing system.

DETAILED DESCRIPTION

The following describes an implementation of the present invention in detail with reference to the accompanying drawing.

As shown in FIG. 1, a multi-optical shooting system includes an optical lens 1, where a spectroscopical module 2 that can split a light wave transmitted from the optical lens 1 into several light waves in different wavelength ranges is disposed on an imaging side of the optical lens 2; the shooting system further includes at least two photosensitive chips 3 configured to receive light signals that are obtained by means of splitting by the spectroscopical module 2; the shooting system further includes an image processing system 4 that can integrate and output light waves received by the photosensitive chips 3; and the spectroscopical module 2 includes at least one spectroscopical component, where the spectroscopical component is a prism, a thin film, or a plane mirror. By means of the prism, the thin film, or the plane mirror, light splitting can be performed, and an effect of the light splitting is good. Light may be split into several light waves in different wavelength ranges. The light wave in each wavelength range matches a different photosensitive chip, so that definition of an entire picture finally formed by the shooting system is greatly increased.

As shown in FIG. 1, in this embodiment, a coating film layer is used on the surface of the spectroscopical module 2. Multiple coating film layers are used, that is, the spectroscopical module is plated with multiple layers of films, so that light waves in some wavelength ranges reflect light waves in some other wavelength ranges, implementing light splitting.

As shown in FIG. 1, in this embodiment, there is an included angle a between the optical lens 1 and the spectroscopical module 2, where $0<a<180°$. Light emergent from the optical lens may be split by the spectroscopical component.

As shown in FIG. 1, in this embodiment, the spectroscopical module 2 includes at least one spectroscopical component, and can split a light wave transmitted from the optical lens 1 into multiple light waves in different wavelength ranges. A quantity of spectroscopical components is not specifically limited herein.

As shown in FIG. 1, in this embodiment, the shooting system includes at least one spectroscopical module 2. There may be two or more spectroscopical modules, and this is not specifically limited herein.

As shown in FIG. 1, in this embodiment, the shooting system includes at least two photosensitive chips 3. There may be three or more photosensitive chips, and this is not specifically limited herein.

In a manner of using the spectroscopical modules 2 and matching multiple photosensitive chips 3 that receive light waves in different wavelength ranges, the spectroscopical modules 2 split light emergent from the optical lens 1 into different light waves in different wavelength ranges, the different photosensitive chips 3 matching the spectroscopical modules 2 separately receive the different light waves, where the different photosensitive chips 3 separately receive the light waves in the particular wavelength ranges, and finally the image processing system 4 implements image restoration and reproduction, thereby improving definition of an optical system, improving color restoration, and implementing clear imaging for the shooting system even in an environment with low illuminancy.

What is claimed is:

1. A multi-optical shooting system, including an optical lens (1), and at least two spectroscopical modules (2) disposed on an image side of the optical lens (1), the at least two spectroscopical modules (2) being spaced apart from each other along an optical axis of the optical lens (1), wherein the at least two spectroscopical modules (2) split a light wave transmitted from the optical lens (1) into several light waves in different wavelength ranges; the shooting system further includes at least three photosensitive chips (3) configured to receive light signals that are obtained by means of splitting by the at least two spectroscopical modules (2); the shooting system further includes an image processing system (4) that integrates and outputs light waves received by the photosensitive chips (3); and each spectroscopical module (2) includes at least one spectroscopical component, wherein the spectroscopical component is a prism, a thin film, or a plane mirror; wherein a layer of coating film is provided on a surface of the spectroscopical modules (2).

2. The multi-optical shooting system according to claim 1, wherein multiple layers of coating film are provided on the surface of the spectroscopical modules (2).

3. The multi-optical shooting system according to claim 1, wherein there is an included angle a between light emitted by the optical lens (1) and each spectroscopical module (2), wherein $0<a<180°$.

4. The multi-optical shooting system according to claim 1, wherein the shooting system comprises more than three spectroscopical modules (2) and more than four photosensitive chips (3).

* * * * *